US008955148B1

(12) United States Patent (10) Patent No.: US 8,955,148 B1
Biegala et al. (45) Date of Patent: Feb. 10, 2015

(54) MATRIX SECURITY MANAGEMENT SYSTEM FOR MANAGING USER ACCOUNTS AND SECURITY SETTINGS

(71) Applicants: Alexandre Biegala, La Madeleine (FR); Sebastien Goiffon, Nimes (FR)

(72) Inventors: Alexandre Biegala, La Madeleine (FR); Sebastien Goiffon, Nimes (FR)

(73) Assignee: GB & Smith SARL, Lille (FR)

( * ) Notice: Subject to any disclaimer, the term of this patent is extended or adjusted under 35 U.S.C. 154(b) by 0 days.

(21) Appl. No.: 14/057,379

(22) Filed: Oct. 18, 2013

(51) Int. Cl.
*G06F 17/30* (2006.01)
*H04L 29/06* (2006.01)
(52) U.S. Cl.
CPC ............... *H04L 63/10* (2013.01); *G06F 17/30* (2013.01)
USPC .......................................................... 726/27
(58) Field of Classification Search
USPC .......................................................... 726/27
See application file for complete search history.

(56) References Cited

U.S. PATENT DOCUMENTS

| | | | | |
|---|---|---|---|---|
| 5,491,791 | A * | 2/1996 | Glowny et al. | 714/37 |
| 6,408,336 | B1 * | 6/2002 | Schneider et al. | 709/229 |
| 8,353,016 | B1 | 1/2013 | Pravetz et al. | |
| 2003/0079051 | A1 | 4/2003 | Moses et al. | |
| 2006/0026655 | A1 * | 2/2006 | Perez | 725/91 |
| 2007/0239653 | A1 | 10/2007 | Kiehn | |
| 2010/0011302 | A1 | 1/2010 | Stein et al. | |
| 2012/0233667 | A1 | 9/2012 | Amirov et al. | |

FOREIGN PATENT DOCUMENTS

WO 2012/001667 A1 1/2012

OTHER PUBLICATIONS

Reeder et al., "Expandable Grids for Visualizing and Authoring Computer Security Policies", 2008, CHI 2008 Proceedings, pp. 1473-1482.*
Robert W. Reeder, et al., "Expandable Grids for Visualizing and Authoring Computer Security Policies," Institute for Software Research, Paper 19, http://repository.cmu.edu/isr/19 (2008).
Microsoft, "Best practices for permissions and user rights," http://technet.microsoft.com/en-us/library/cc779601.aspx, Updated: Jan. 21, 2005.
Butler W. Lampson, "Protection," Xerox Corporation, Palo Alto, CA (1971).

(Continued)

*Primary Examiner* — William Powers
(74) *Attorney, Agent, or Firm* — David J. Kulik; Paul M. Kim; Wiley Rein, LLP

(57) ABSTRACT

A network accessible user interface system for managing computer security rights is provided. The user interface system may include a graphical user interface for displaying and managing access rights to computer resources on a computer system or network, a collapsible navigation tool, and an administrator authentication module. The graphical user interface may contain security matrices, each with at least two axes that display the resource and resource container hierarchy of the computer system and/or network, and also display the security principal hierarchy of the computer system and/or network, as well as the access rights the principals have to the corresponding resources on the computer system and/or network.

25 Claims, 12 Drawing Sheets

(56) References Cited

OTHER PUBLICATIONS

Mark S. Miller, Ka-Ping Yee and Jonathan Shapiro, "Capability Myths Demolished," Mar. 2003 http://srl.cs.jhu.edu/pubs/SRL2003-02.pdf) (PDF). Technical Report SRL2003-02. Systems Research Laboratory, Department of Computer Science, John Hopkins University.

Heather Richter Lipford, et al., "Visual vs. Compact: A Comparison of Privacy Policy Interfaces," ACM CHI 2010: Input, Security, and Privacy Policies, Apr. 10-15, 2010, pp. 1111-1114.

* cited by examiner

MATRIX SECURITY MANAGEMENT SYSTEM FOR MANAGING USER ACCOUNTS AND SECURITY SETTINGS

INTRODUCTION AND BACKGROUND

Systems and methods consistent with the exemplary embodiments relate to a matrix security management system that allows administrators to manage rights and privileges for principals over resources in a computer system or computer network. Principals refer to principal groups and individual principals, for example user groups and users. Resources refer to resource containers and individual resources, for example folders and files. In particular, the exemplary embodiments relate to improvements in visualizing and assigning large and complex file permission settings for a computer system or network.

Systems and methods of the related prior art allowed IT administrators to assign rights and privileges over resources in a computer system or network, but did so in a way that made it difficult for the administrator to quickly, easily and correctly implement security settings for large computer systems or networks and to comprehensively monitor existing security settings for mistakes in security settings and/or security breaches. This was especially true for large and complex networks where the number of resources and users created an overwhelming amount of information that could not be practically viewed on prior art network administrator user interfaces. More specifically, two main challenges facing the administrator of any computer system are: 1) setting up security (rights and access between groups and contents); and 2) monitoring the security deployment to ensure that security breaches have not occurred by auditing the security system.

Setting up security for a computer system is done on an individual basis: each user or user group ("security principal") is granted rights to a computer resource (e.g., workstations, computer drives, folders, files, printers, programs, processes, apps, database tables, database views, etc.) one at a time. Additionally, administrators may grant rights to a resource at various granularity levels, for instance granting a user one set of rights at a folder level, but also having the ability to grant the user a separate set of rights to a file contained within the folder. This ability to set rights at different granularity levels often leads to improper security access being granted to users, which then leads to security breaches and unauthorized access of sensitive information, or may lead to improper access denial to computer resources for a user which causes end user frustration and/or customer service complaints to the network administrator (see FIG. 13).

In recent years, a new problem has emerged for IT administrators in the form of Government mandated data security regulations, examples of which include HIPAA and Sarbanes-Oxley in the United States and Basel and Solvency in the European Union. These regulations require that greater security measures be undertaken to prevent data breaches involving sensitive personal information, such as medical records, or to create "internal controls" that police against unauthorized transactions or manipulation of internal corporate data, such as financial data. While there are other security tools that can help secure a computer system from outside intruders, such as the implementation of digital certificates, private-key cryptography, encrypted passwords, etc., these methods provide no protection if the user authentication process for all of the software, files, and other computer resources on the network is not properly set and maintained. Any mismanaged user rights may grant access to inappropriate content to one or more users, exposing the company and its clients to economic harm, legal liability, or public embarrassment. Furthermore, for government institutions, such as the military or intelligence agencies, such unauthorized access of materials may lead to the public disclosure of sensitive or classified information.

Additionally, for popular websites such as financial websites, social media websites (e.g., Facebook, Twitter, etc.), and webmail websites (e.g., Gmail, Yahoo, etc.), that provide their users with individual accounts, encryption tools provide incomplete protection of important username and password information because they cannot protect the user from hacking and "phising" of their account passwords. These user account breaches have been known to lead to wider spread data security breaches due to the improper application of security rights for such compromised user accounts. Having the proper level of computer permissions set on each user account helps to mitigate the amount of damage done by a hacking/phising attack by limiting the hacker's access to just the account of the individual user that he hacked, and not to the entirety of the computer system.

Current operating systems, such as UNIX, Linux, and Microsoft Windows, and enterprise software systems, such as databases, email programs, or SaaS software, provide security and permissions tools integrated into the software system, however these tools often are not user-friendly and can lead to errors in setting or maintaining security permissions. For example, Microsoft provides administration tools for managing NTFS security and access (see FIGS. 1-3) in its Windows operating systems that support the NTFS file system (e.g., Windows NT 3.1, Windows NT 3.5, Windows 2000, Windows XP, Windows Vista, Windows 7, and Windows 8), but these tools are often difficult and confusing to use, even for sophisticated users such as computer administrators. As can be seen in FIGS. 1-3, and as users of Microsoft Windows would understand and appreciate, permissions have to be managed individually for each file or folder in order to allow or deny access to users and groups from windows. One of ordinary skill in the art would understand that the more computer resources there are that need securing and the more groups and users there are that need to be given permission to access and modify the computer resources, the longer, more repetitive and more prone to error the process becomes (see also FIG. 13, which depicts the steps an administrator has to take in order to set security permissions in a Microsoft Windows 2008 Advanced Server). While this may be acceptable for small computer systems or networks that have a small number of users and a limited number of computer resources to protect, for large companies and large software deployments, it can amount to thousands of input screens and thousands of mouse clicks. Multiplying the number of existing computer resources by the number of users identified in the system gives an idea of the overall number of possible permissions combinations. Thus, there is a substantial risk of administrative error and an excessive amount of time spent administrating the system.

And even when the implementation of security settings is complete, maintaining, updating, and understanding the security setup becomes impossible. Routine security auditing questions such as determining what an individual user can see, modify, create, or determining who can see, modify and delete specific content becomes time-consuming tasks for IT administrators. Therefore, auditing security globally is a very difficult task to implement using currently available solutions.

Moreover, computer resources and security principals are often organized and classified under hierarchies, sometimes representing the organization's structure. For example, network shared files may be classified in a folder hierarchy and domain users in a user group hierarchy that reflect the groups and subgroups of a company or other organization. In such a hierarchy, principals and computer resources may have multiple antecedent (i.e., parent) and descendant (i.e., child) principals or resources in its hierarchy. Therefore, permissions inheritance makes the implementation and understanding of software security more complex. The effective permissions for a principal over a resource consist of two types of permissions: explicit permissions and inherited permissions. Explicit permissions are those that are set by default when the resource is created, or by an administrator action. Inherited permissions are those that are propagated to a resource from a parent resource. Therefore, the effective permissions existing between a principal and a computer resource are made of merged inherited permissions that have been previously established for the principal antecedents and the computer resource, or the resource's antecedents, and explicitly set permissions. For example, if the "delete" permission has been granted to a user for a specific file, but the permission has been denied for the user's antecedent group, the resulting merged right will be granted based on the underlying software or operating system's default security permissions' merging rules. And in the case of NTFS-based Windows operating systems, the merging rule for these situations is that explicit permissions take precedence over inherited permissions, even inherited deny permissions. Further complicating matters is the fact that merging rules vary by operating systems and software systems, thus complicating the administration of computer system/network and software systems, especially if the administrator is overseeing multiple software systems or operating systems that have different default merging rules. Furthermore, because the permission that is set for an antecedent principal/resource may differ from the permission set for a descendant principal/resource, in some prior art user interfaces it was difficult to determine what the actual security permissions of a principal were without investigating every antecedent or descendant resource and principal to see whether under the system's merging rule the permission was set as the administrator intended.

SUMMARY

It is therefore desirable to provide systems and methods of computer security management that provide an improved user interface for the implementation and management of computer resources' security settings and principals' permissions in order to reduce the number of errors committed by IT administrators.

It is also desirable to provide systems and methods that include improved user interfaces that provide clearer, more efficient ways to identify whether a mistake has been made in applying security settings, and to also provide means for determining the root of inherited rights and the merger of rights.

It is an object of the present invention to reduce the number of steps that an administrator has to undertake in order to administrate the resources of large computer systems or networks.

It is another object of the present invention to provide means of evaluating and auditing the security settings of a computer system or networks.

According to an aspect of one or more exemplary embodiments, there is provided a graphical user interface for computer resource security and user permissions management that would be applicable to a wide range of software packages (e.g., SaaS software, database software, and email software, etc.), operating systems (e.g., NTFS based Microsoft Windows operating systems, such as Windows NT 3.1, Windows NT 3.5, Windows 2000, Windows XP, Windows Vista, Windows 7, and Windows 8, Linux, such as, Red Hat, Debian, openSUSE, etc., Unix, such as Solaris, AIX, etc., Mac OS X, iOS, Android, etc.), and on file systems (e.g., NTFS, FAT32, HFS+, XFS, ext2, and ext3, etc.), to make the setting of a security policy easier. It would allow an IT administrator to implement new rights and to audit existing rights at any time on a global, efficient, simple, intuitive and visual fashion. The provided solution may be used to manage security permissions over resources to any future computer system that require a security management for principals over resources.

According to an aspect of one or more exemplary embodiments, there is provided a matrix security management system for managing security rights over a computer system or network. The system according to one or more exemplary embodiments may include a graphical user interface for displaying, and managing, at least one principal and at least one computer resource and their respective access rights and settings. The graphical user interface may include a module configured to read and modify the user rights and permissions of at least one computer resource installed on a computer system or network for at least one principal. The graphical user interface may include a collapsible navigation tool, and may also include at least one security matrix for the display and management of resources and principals, with the security matrix possibly including a visual, aural, sensory, or software indicator, such as an icon, sound, vibration, or software flag, that identifies the existence of individual principals that have explicit access rights to one or more of the resource or resource containers displayed in at least one security matrix. The graphical user interface may also include an authentication module.

The graphical user interface may further include a main security matrix that may include at least two axes, the axes of the main security matrix representing separate hierarchies of elements. The first axis of the main security matrix may represent the hierarchy of one or more resource containers on the computer system or network, and the second axis of the main security matrix may represent the hierarchy of one or more principal groups of the computer system or network. The main security matrix may further include one or more matrix cells that display the access right granted to the principal group that the matrix cell corresponds to, over the resource container that the matrix cell corresponds to.

The graphical user interface may further include a secondary security matrix that may include at least two axes, the axes of the secondary security matrix representing separate categories of elements. The secondary security matrix may further include a first axis representing one or more resources within a resource container on a computer system or network, may also include a second axis representing one or more principal groups of a computer system or network, and may further include one or more matrix cells that display the access rights granted to the principal group that a matrix cell corresponds to over the resource that the matrix cell corresponds to.

The graphical user interface may include a navigation tool that may include at least one panel area for the display of information about a computer system or network. The navigation tool may include a first panel that displays a nested tree representation of the resource containers of a computer system or network, may also include a second panel area that displays a nested representation of the principal groups of a computer system or network, and when an element is selected in a panel, the system may cause the element and all of the element's antecedents to populate a security matrix. The navigation tool may remove a selected element and the selected element's descendants automatically from a security matrix if the selected element is deselected from a navigation tool. The navigation tool may remove a selected element and the selected element's descendants automatically from a security matrix if the selected element's title is selected in the security matrix.

The authentication module may be configured to authenticate an administrator accessing a matrix security management system and may be further configured to determine the access level of an administrator. The authentication module may be further configured to populate an administrator's graphical user interface with the appropriate display commensurate with the administrator's access level, and may be further configured to restrict an administrator's graphical user interface from displaying information that is not within the administrator's access level.

According to another aspect of one or more exemplary embodiments, there is provided a method for administering security rights over a computer system or network. The method according to one or more exemplary embodiments may include authenticating an administrator of a computer system or network, may include determining an administrator's access level for the computer system or network, and may grant access to an administrator to a graphical user interface that displays tools and information commensurate to the administrator's determined access level and restricting the administrator's graphical user interface from displaying information that is not within said administrator's access level. The method may further include displaying a graphical user interface that may include at least one security matrix that allows for the management of resources and principals of a computer system or network, may also include identifying the existence of individual principals that have explicit access rights to one or more of the resource or resource containers of a computer system or network using a visual, aural, sensory, or software indicator, such as an icon, sound, vibration, or software flag, and may accept a selection input from an administrator of at least one computer resource installed on a computer system or network or at least one principal for management through the graphical user interface, and may accept and implement modifications from said administrator to the rights and permissions of at least one computer resource for at least one principal.

The method may include generating a main security matrix of at least two axes, the axes of the main security matrix representing separate hierarchies of elements, generating a first axis of the main security matrix representing the hierarchy of one or more resource containers on a computer system or network, generating a second axis of the main security matrix representing the hierarchy of one or more principal groups of a computer system or network, generating one or more cells that display the access right granted to the principal group that the cell corresponds to, over the resource container that the cell corresponds to, and may also include displaying the generated main security matrix.

The method may include generating a secondary security matrix with at least two axes, the axes of the secondary security matrix representing separate categories of elements, generating the first axis of the secondary security matrix representing one or more resources within a resource container on a computer system or network, generating the second axis of the secondary security matrix representing one or more principal groups of a computer system or network, generating one or more cells that displays the access rights granted to the principal group that the cell corresponds to over the resource the cell corresponds to, and may also include displaying the generated secondary security matrix.

The method may include generating a navigation tool with at least one panel area for the display of information about the computer system or network, generating a first panel area that displays a nested tree representation of the resource containers of a computer system or network in the navigation tool, generating a second panel area that displays a nested tree representation of the principal groups of a computer system or network in the navigation tool, where selecting an element contained within the first or second panel areas may cause the element and all of the element's antecedents to populate a security matrix, and may include displaying the navigation tool.

The method may include removing an element and the element's descendants from a security matrix when the element has been deselected from a navigation tool, and removing an element and the element's descendants from a security matrix when the element's title has been selected in a security matrix.

DETAILED DESCRIPTION OF EXEMPLARY EMBODIMENTS

Figure 1:
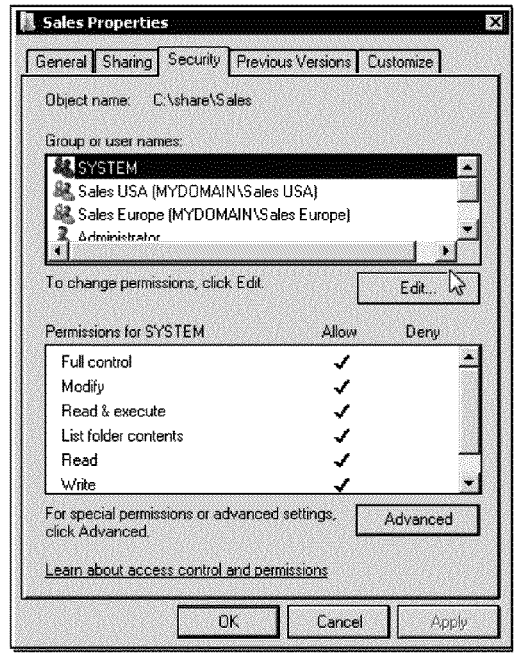
FIG. 1 illustrates a prior art Microsoft Windows 2008 Server Security Settings user interface.

The present invention provides systems and methods for a security management user interface to manage rights for principals over any resources of a computer system or network, or a software system. Preferably, the various systems and methods described herein are implemented using one or more computer processors running on one or more computer systems (or one or more virtualized computer systems), preferably interconnected via a computer network, such as an intranet or an extranet, or across the Internet, thereby establishing a computerized system and method for the present invention. One of ordinary skill in the art would recognize that the present invention may also be implemented on a single computer, possibly configured to use virtualized hardware and software. That is, the methods described herein may be executed by one or more computer systems, and may be software implemented (e.g., one or more software programs executed by one or more computer systems or processors), hardware implemented (e.g., a series of instructions stored in one or more solid state devices), or a combination of both. Software components of the system is preferably written in a high level computer language such as any of the Microsoft .NET languages, JAVA, C/C++, PHP, or the like, but one of ordinary skill in the art would appreciate that the software may be written in low level programming languages such as machine language or assembly language. The computer may be a conventional general purpose computer, a distributed computer, or any other type of computer. Furthermore, the computer may comprise one or more processors, such as a single central processing unit or a plurality of processing units, commonly referred to as a parallel processing environment. The term "processor" as used herein refers to a computer microprocessor and/or a software program (e.g., a software module or separate program) that is designed to be executed by one or more microprocessors running on one or more computer systems.

The systems and methods disclosed herein are an improvement on currently existing computer security management tools and systems.

For purposes of illustration and without intending to limit the present teachings, the invention will be described in connection with the graphical user interfaces for security management system of a network file system running on an NTFS based operating system, such as Microsoft Windows 2008 Server. One of ordinary skill in the art will appreciate how to adapt the teachings herein to other contexts (e.g., databases, document management platforms, web portals, business intelligence platforms, or any other system requiring the management of the security over a large volume of information) or other articles of commerce (e.g., implementing a security management system for administration of users, such as a SaaS service, email server, social media website, extranets, etc.). Furthermore, descriptions of well-known concepts, technologies, and parts are omitted for clarity.

Matrix User Interface

One of the advantages of the present invention is the development of a matrix user interface which allows the present invention to be deployed over several IT environments. If deployed as a web interface (i.e., the security management system is accessible across the Internet or an intranet), the matrix security management system may be displayed on a webpage that is accessible from any Internet browser via a web portal hosted on a server. The server may be hosted internally by a company, may be hosted by a third party, or may be a cloud-based server, as one of ordinary skill in the art would understand and appreciate. If the security management system is deployed as a thick client tool, the matrix security management user interface may be deployed on one or more workstations. Discussion relating to the exemplary embodiments describe the management of security rights over network files and folders that have been implemented in a Microsoft .NET development environment using CSharp (C#), RAZOR, and ASP for use on an NTFS based Microsoft Windows operating system running Microsoft's Active Directory service for the sake of clarity and are not intended to be limiting, and that one of ordinary skill in the art will appreciate that the teachings may be implemented to use alternate development environments and/or implemented for use on alternate operating systems or software systems.

Implementing the Security Matrix User Interface Over Microsoft NTFS File System

For the sake of clarity, the security management system will be described as running on a Microsoft Windows operating system running the NTFS file system. The exemplary graphical user interface may be programmed using the CSharp (C#) programming language. Microsoft Visual Studio's integrated development environment (IDE) may be used to develop the security matrix user interface as a web application, with managed code for all platforms supported by Microsoft Windows IIS web server application and the Microsoft .NET Framework 4.5 API.

Scope

Depending on its implementation, the exemplary user interface may be targeted at a subset of resources and principals that exist on a computer system or network for administrative or security purposes. Therefore, the present invention may be used to manage principals' security permissions over resources of a part of a computer system or network, a whole computer system or network, or several computers systems or networks together. The present invention may be used to manage security rights for targeted principals or all principals identified in a computer system or network. For the sake of clarity, the exemplary embodiments will discuss the use of the exemplary user interface with the entire set of resources and principals that exist on a computer system.

Authentication

Figure 14:
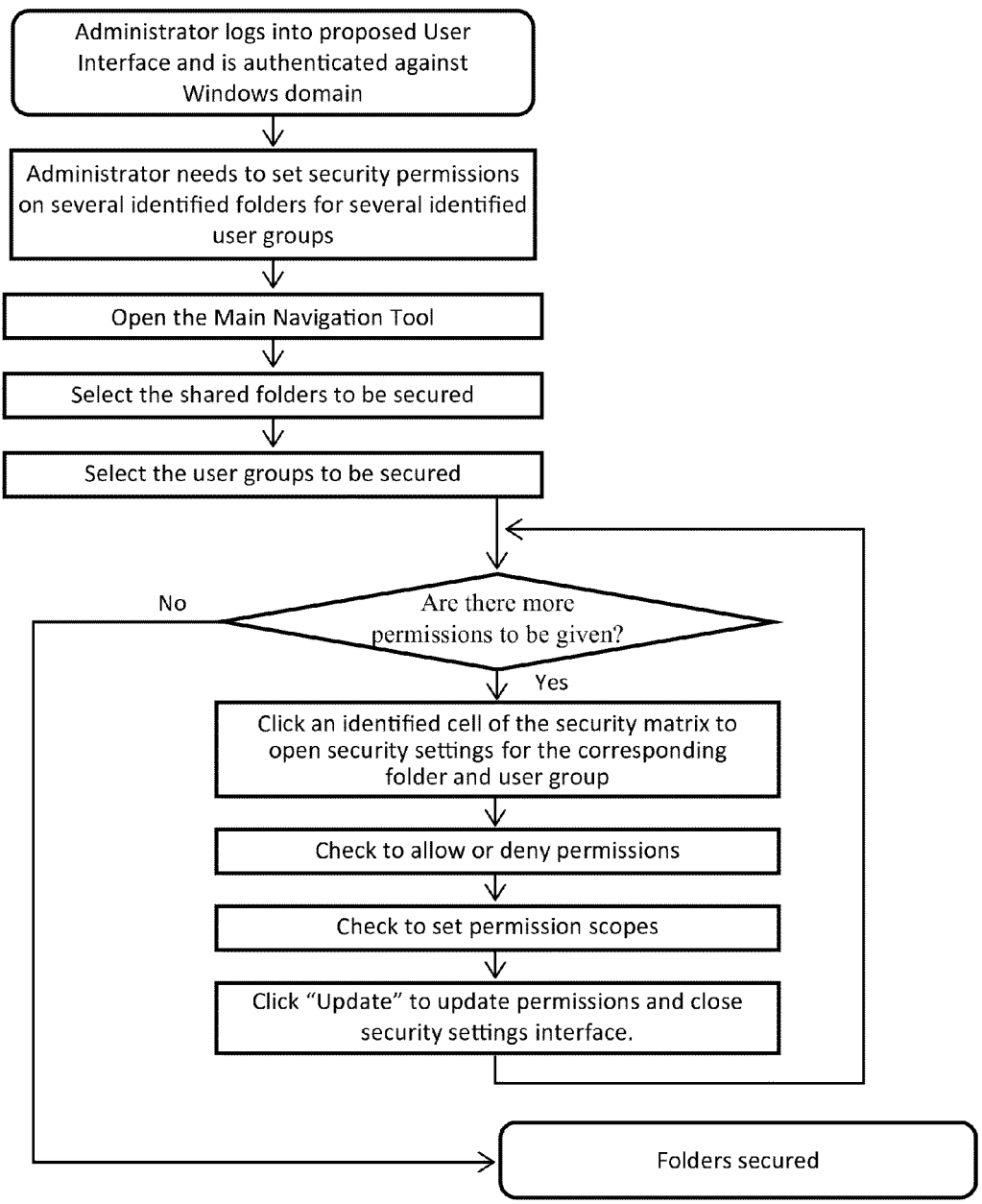
FIG. 14 is a flowchart depicting an exemplary process for setting computer permissions and rights.

Initially, a computer network administrator, or similar user, may access the user interface through a web portal (using a web browser, such as Microsoft Internet Explorer, Mozilla Firefox, Google Chrome browser, Apple Safari, or the like), or a thick client application if deployed on a workstation. In a first embodiment, the administrator will then undergo an authentication procedure via an authentication module of the security management system. This authentication module (see FIG. 14) will interrogate the administrator and ask for the administrator's username and password, and if the administrator has provided the proper credentials, will then provide the administrator access to the graphical user interface of the security management system. In an alternate embodiment, the administrator can be logged using single-sign-on. Using single-sign-on, an administrator logs into the operating system (or software platform) first, with the operating system then passing along the administrator's authentication credentials to the present invention, thus allowing the administrator to access the system without being prompted to log in again. For example, the current invention may integrate into the Windows authentication procedure by creating an authentication application using Visual Studio to create an automatic required logon form and controllers that will authenticate a given username and password against an Active Directory domain present in the system or network.

Once an administrator has been authenticated, the authentication module will determine the level of the administrator's rights to the resources and principals (i.e., users and groups) that they have authority over by reviewing the administrator's Active Directory domain rights, or by reviewing the security management system's internal database, and will only allow the administrator access to the rights that they are authorized to see through the matrix interface. Thus, different administrators of the security management system might not be granted the same level of access to the security system, and might not have access to the same security management system tools or views as the other. For example, an IT administrator may be able to access a matrix whose aim is to analyze all of the computer resources of a system, while a deputy administrator may only be granted access to a matrix that is limited to the computer resources and principal groups that belong to a single department.

Main View

Figure 2:
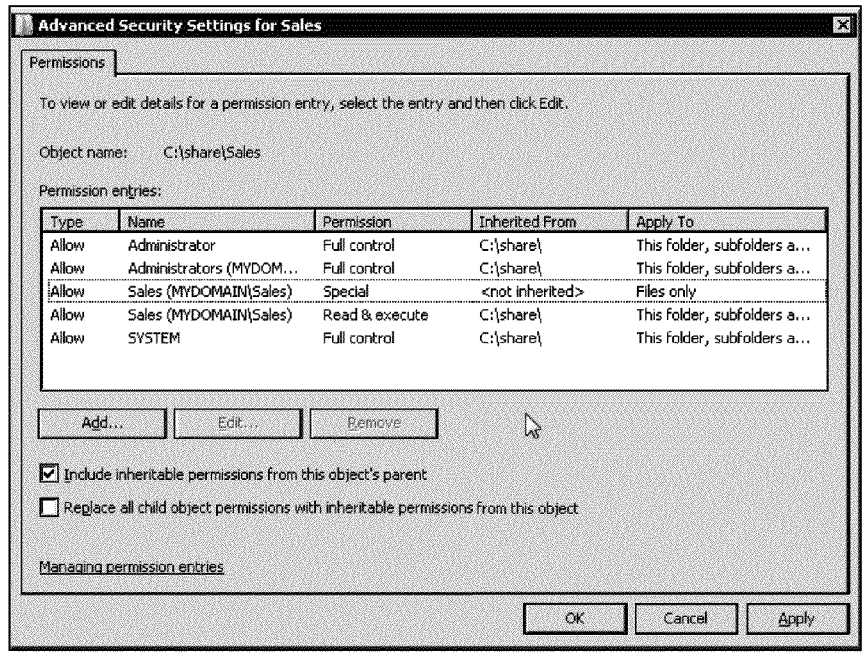
FIG. 2 illustrates a prior art Microsoft Windows 2008 Server Advanced Security Settings user interface.
Figure 3:
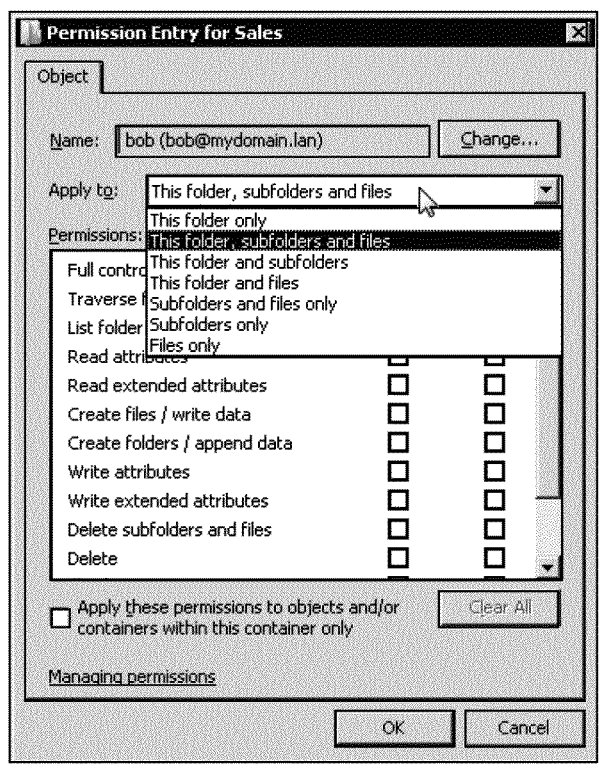
FIG. 3 illustrates a prior art Microsoft Windows 2008 Server Security Permission Entry and Security Inheritance Propagation Scope user interface.

One of the problems plaguing prior art security management user interfaces, such as the Microsoft user interfaces discussed above, is the volume of data that a security management system's graphical user interface must display for large deployments. When faced with an overwhelming amount of data, the prior art user interfaces, such as the Microsoft user interfaces (see FIGS. 1-3) failed to provide an easily digestible display of the privileges and permissions over resources for a large computer system. However, as depicted in the exemplary embodiment, the present invention employs at least two security matrices to depict all of the categories of computer resources that must be managed, thus providing a more easily digestible user interface for the security management system.

Figure 4:
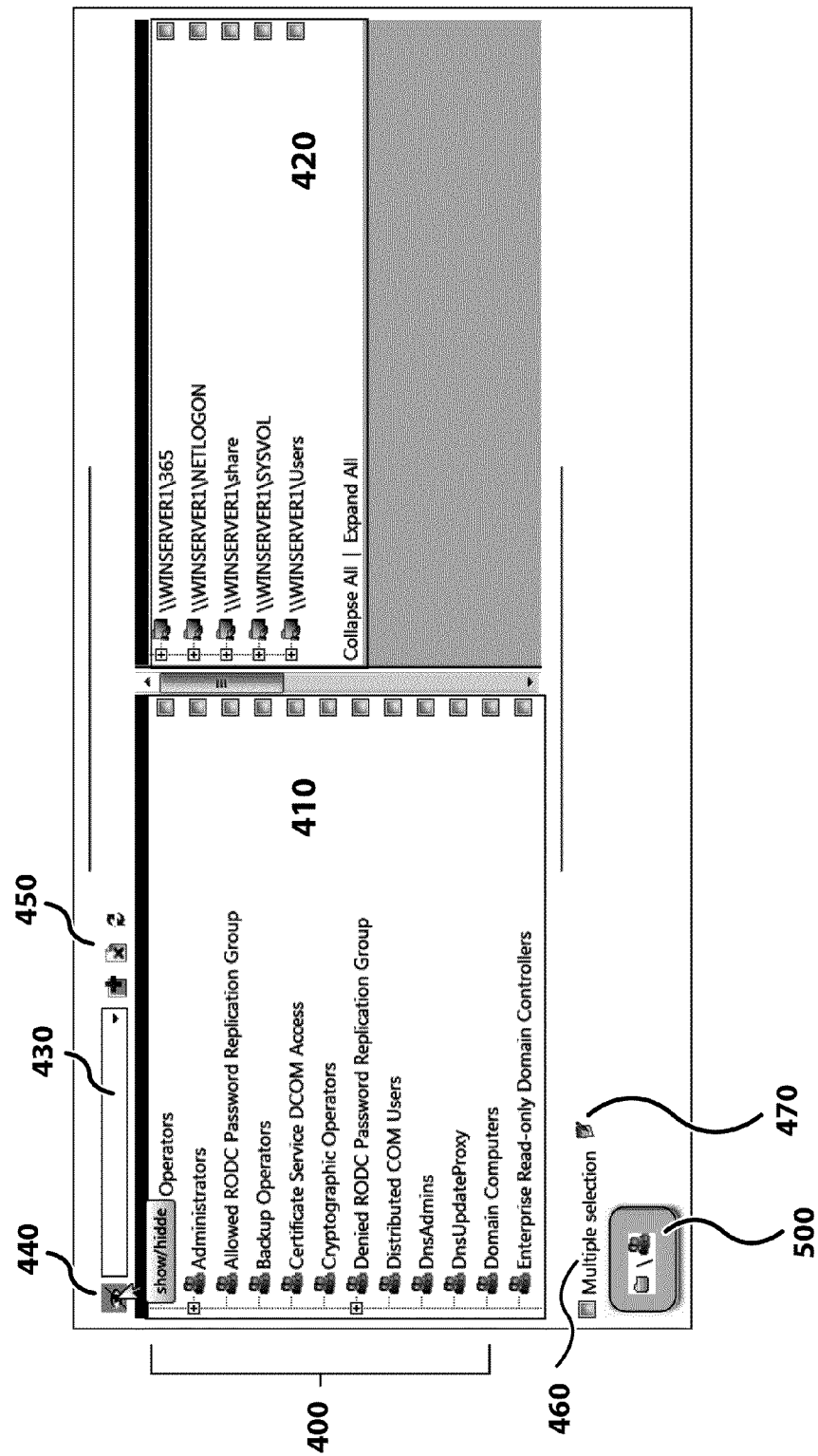
FIG. 4 illustrates the Main Security Matrix with the Main Navigation Tool hidden in the Main View according to an exemplary embodiment.

Referring now to FIG. 4, the main view allows an administrator to manage the security rights and permissions of principals (e.g., groups and users) over resource containers (e.g., folders, directories, categories, etc.) on the system that is available to the administrator's authenticated access level.

The main view's initial state is made up of a hidden main navigation tool and an empty main security matrix. One feature of the matrix user interface is to allow the administrator to display or hide the main navigation tool (see FIG. 4) at any time in order to easily select the computer system principals and computer resource containers to be displayed in the main security matrix. In this way an administrator can target a specific part of an information system and then monitor or implement the related security rights. After this has been done, the main navigation tool may be hidden so that the main security matrix can be fully viewed on the administrator's screen (see FIG. 6). The main navigation tool can be opened at any time to select additional principals and resource containers, or modify the selected principals and resource containers displayed in the main security matrix (see FIG. 5).

Main Navigation Tool

Referring again to FIG. 4, the exemplary embodiment contains a main navigation tool (400). As discussed above, the purpose of the main navigation tool (400) is to give the administrator the ability to select principal groups (e.g., Active Directory user groups), and resource containers (e.g., file folders as found in NTFS based systems or their equivalents in other environments) thereby allowing the administrator to monitor or implement security policies inside a security matrix. Before the selection of principal groups and resource containers by the administrator, the main security matrix (500) will be empty. The main navigation tool (400) can be displayed or hidden by clicking on an icon (440) (FIG. 4).

The main navigation tool (400) is made up of two panels: on the left-hand side is a tree-view that displays the hierarchical structure of principal groups available on the computer system (410), and on the right-hand panel of the main navigation tool is a tree-view displaying the hierarchical structure of resource containers of the computer system (420). The administrator has the ability to expand or collapse each branch of a tree in order to display the descendants of the resource containers or the descendants of the principal groups of the branch inside the navigation tool. The administrator may expand all of the principal groups and resource containers on a single level. The administrator may also collapse the branches on every level.

Figure 5:
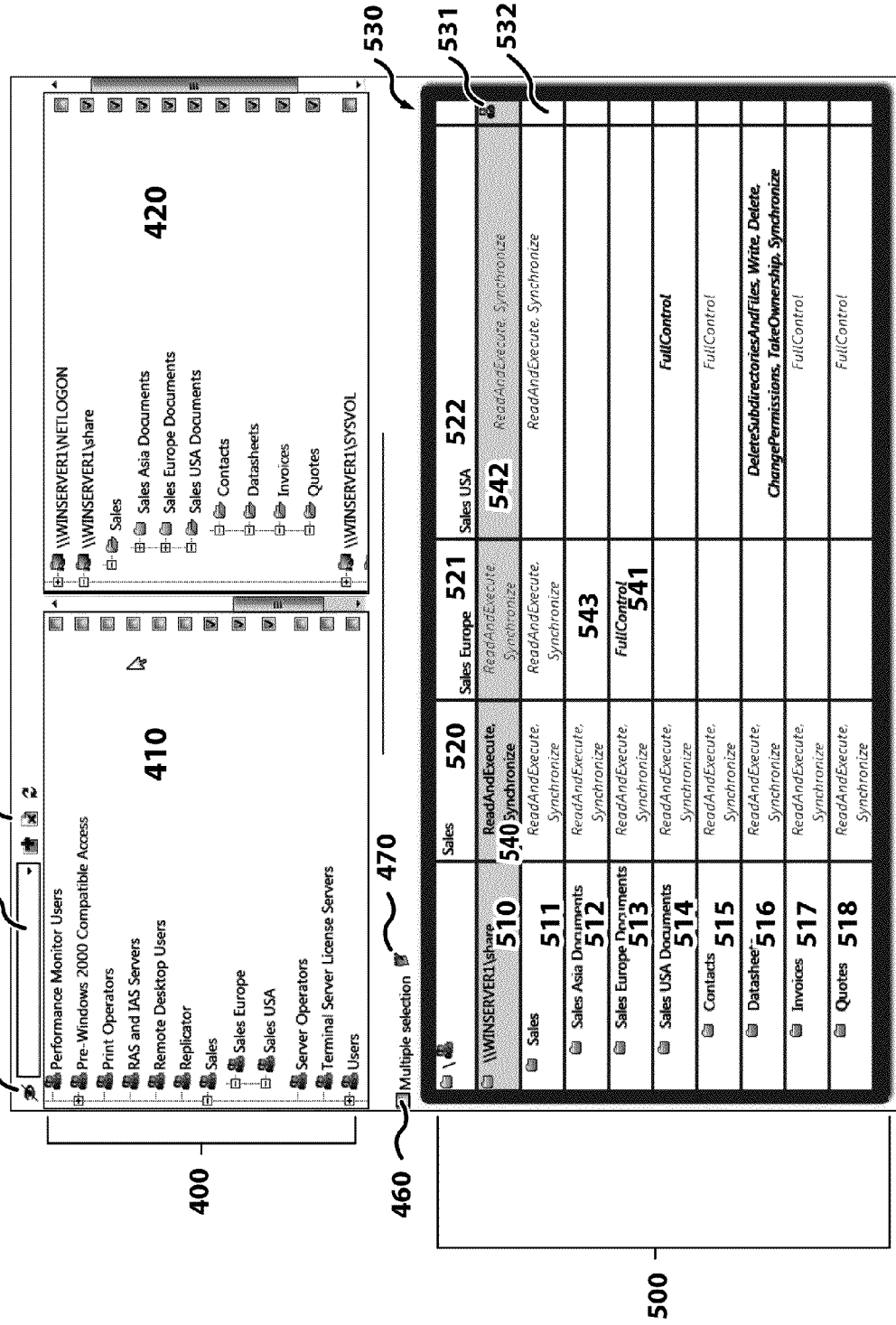
FIG. 5 illustrates the Main Navigation Tool and Main Security Matrix populated with selected resource containers and selected principal groups according to an exemplary embodiment.

Referring now to FIG. 5, the administrator may select principal groups and resource containers in the main navigation tool (400) for viewing in the main security matrix (500). The selected resource container and principal group will then be displayed as a new row (510 to 518) or column (520 to 522) in the main security matrix. When a principal group or a resource container is selected, each and every antecedent of the currently selected element will be selected automatically, if it has not already been manually selected by the administrator. Because all of the selected elements, along with their antecedents, are displayed in the main security matrix (500), the system allows the administrator to quickly determine visually how a right has been inherited from an element's antecedents, by merely viewing the main security matrix.

Deselecting a resource container or a principal group in a security matrix will automatically deselect all of the descendants of that element. The element and its descendants are also automatically removed from the security matrix. It is also possible to remove an element by clicking on the title of the corresponding column or row in the security matrix.

Advanced Navigation

Additionally, the administrator may bring up a context menu (800) when selecting a principal group or resource container in the panels (410 and 420) of the main navigation tool. The context menu (800) offers two choices: A) the selection of all children of the element automatically (810); and B) the selection of a user definable number of descendants automatically (820). If the administrator chooses option B, the administrator may choose the degree of descent using a drop-down list that is automatically generated by the system depending on the number of levels of descendants that the element has. For example, if a folder has nine levels of descendants below it, the administrator will have the option of choosing from 1 to 9 levels of descendants from the drop down list.

Listing Groups in the Main Navigation Tool

The "System.DirectoryServices" library available from the Microsoft Active Directory API, or its equivalent in other LDAP directory service APIs or other software environments, and the "DirectorySearcher" class depicted below may be used to program the retrieval and display of a nested-tree view of all existing Active Directory groups in a particular authenticated Active Directory domain.

The following code example allows the retrieval of all Active Directory root groups, that one of ordinary skill in the art would appreciate as being capable of being sent to an appropriate HTML based web application or C# based thick client application to enable the display of the above discussed principal group listings in the navigation tool:

```
using System.DirectoryServices;

DirectorySearcher search = new DirectorySearcher(rootDirectoryInfo)
{
    SearchScope = SearchScope.Subtree,
    Filter = "(&" +
        "(objectClass=group)" +
        "(!memberOf=*)" +
        ")",
    Sort = new SortOption("cn", SortDirection.Ascending)
};
SearchResultCollection results = search.FindAll( );
```

Listing Shared Folders in the Main Navigation Tool

Furthermore, using the "DirectorySearcher" function above, it is possible to list selected, or all, computers in an Active Directory domain for display in the main navigation tool. Using specific Microsoft Windows operating system dynamic link libraries such as "netapi32," or its equivalents in other software environments, it is possible to enumerate the shared folders on a selected computer system or network. Then using the "System.IO" library, or its equivalents, and the "DirectoryInfo" class available in the .NET Framework 4.5 API, it is possible to list all of the subfolders of the enumerated shared folders:

using System.IO;
DirectoryInfo rootDirectoryInfo=(DirectoryInfo)GetDirectoryInfo(rootNodeId);
return from childFileSystemInfo in rootDirectoryInfo.GetFiles( )
orderby childFileSystemInfo is FileInfo descending
select childFileSystemInfo;

One of ordinary skill in the art would appreciate that the data returned by the above code could then be transmitted to an appropriate HTML based web application or C# based thick client application for display as part of the navigation tool user interface as a listing of the resource containers and resources present on a computer system or network.

Main Security Matrix

Figure 6:
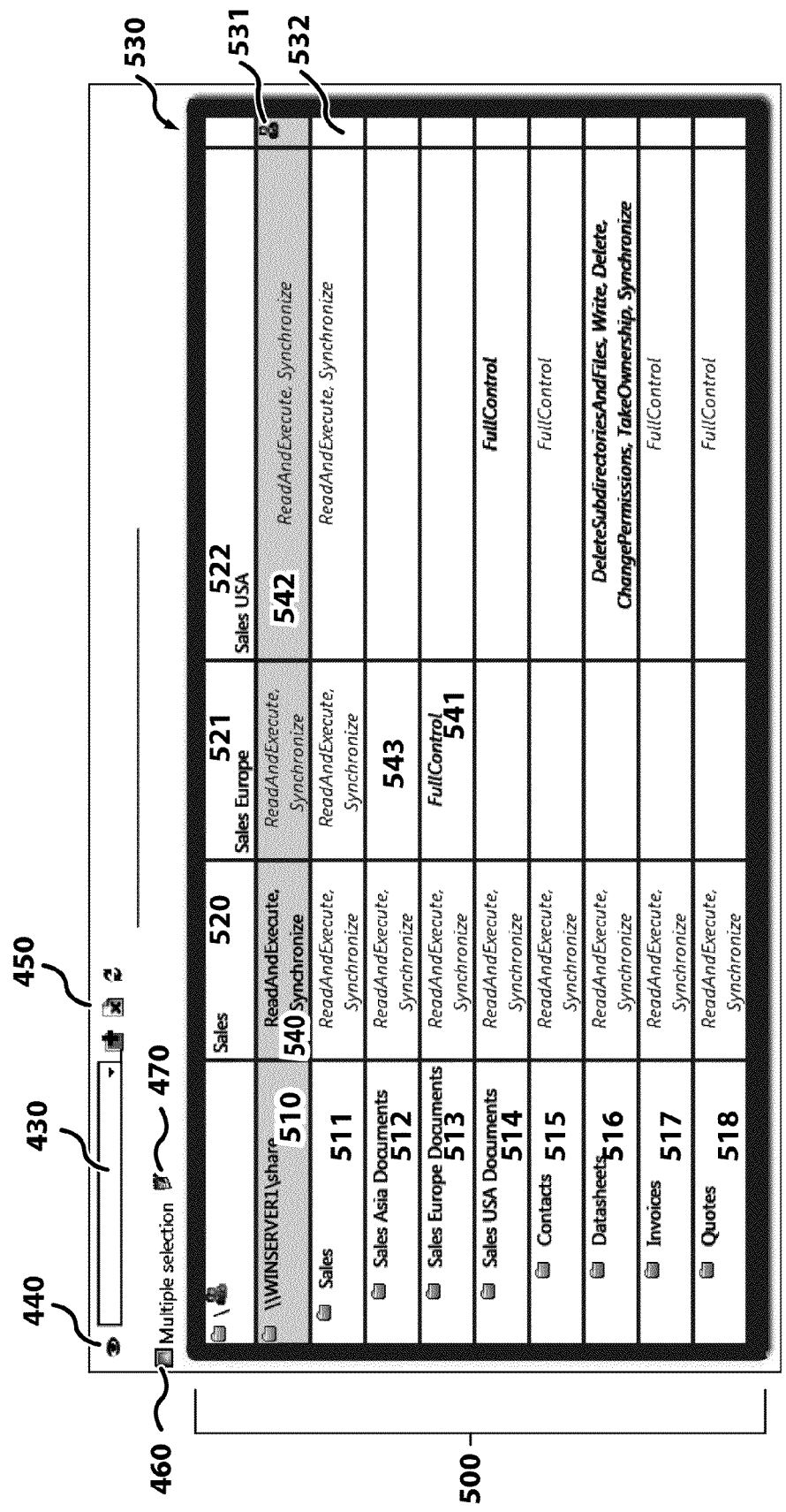
FIG. 6 illustrates the Main Security Matrix populated with selected resource containers and selected principal groups and with the Main Navigation Tool hidden according to an exemplary embodiment.

FIGS. 5 and 6 are diagrams depicting the main security matrix according to an exemplary embodiment. The main security matrix (500) is made up of two axes representing the selected resource containers of the computer system (e.g., 511) and selected principal groups (e.g., 520). The principal groups are represented through a hierarchical structure as the title of the columns, using vertical indentation to visually differentiate sub-groups from parent groups, for example the "Sales" group (520) is vertically higher than the sub-groups "Sales USA" (521) and "Sales Europe" (522). Resource containers are represented through a hierarchical structure as the title of the rows of the matrix, using horizontal indentation to visually differentiate subfolders from parent folders, for example the "Sales" sub-folder (511) is indented from the "\\WINSERVER1 \share" (510) parent folder, and the "Sales USA Documents" sub-sub folder (514) is further indented from the "Sales" sub-folder (511).

Displayed within each individual cell of the security matrix (e.g., 540) is the access right that the principal group has over that container. Rights in each matrix cells are displayed using different indicators. For example, the rights that are explicitly granted between a principal group and a resource container may be displayed in black in the corresponding cell of the matrix (e.g., 540). The rights that are granted through the inheritance of permissions applied to an antecedent element may be displayed in grey italics (e.g., 542). Permissions that result from the merging of explicitly granted rights at an intersection and inherited rights may be displayed in black italics (e.g., 541). If a group does not have any rights to a resource container, the corresponding cell is left blank (e.g., 543). By using distinctive indicators to differentiate how the right was granted the administrator is able to immediately determine the root of the permission's origins for each cell. Thus, it is easy for the administrator to understand, by reading the screen, that the effective right was explicitly granted to the intersection or if the right was inherited totally or partially from any antecedents' permissions.

Displaying the Security Matrix

Using HTML, Javascript and AJAX, if the user interface is to be implemented as a web service, or AJAX, C# and the Microsoft .NET Framework APIs if developed as a thick client application for Microsoft Windows, or equivalent programming languages and APIs for other software platforms, the user interface for the security matrices may be displayed. For each new row or new column added to a security matrix, several asynchronous AJAX queries are transmitted to the Active Directory server, or its equivalent, to retrieve the permissions for the new cells corresponding to the resource container and the principal of each cell. The AJAX queries will then trigger the execution of C# code on the server to transmit the Access Control List ("ACL") back to the present invention.

Using the "System.Security".NET Framework library and the "AuthorizationRuleCollection".NET Framework class, or their equivalents, it is possible to retrieve the permissions included in each ACL of a specific folder for transmission to the present invention and display in the user interface:

using System.Security.AccessControl;
using System.Security.Principal;
FileSystemInfo fsInfo=FileSystemInfosRepository.GetDirectoryInfo(rowID);
FileSystemSecurity fsSecurity=((DirectoryInfo) fsInfo).GetAccessControl( );
AuthorizationRuleCollection acl=fsSecurity.GetAccessRules(true, true, typeof(System.Security.Principal.NTAccount));

Updating Rights

Using the above mentioned "System.Security" library and the "AuthorizationRuleCollection" class, or their equivalents, it is also possible to update the permissions of a specific Folder and a specific User Group:

((DirectoryInfo)fsInfo).SetAccessControl((DirectorySecurity)fsSecurity);

Main Security Matrix Individual Principal Column

Additionally, the last column of the main security matrix (530) identifies the existence of explicit rights between one or more individual principals and a resource container via the presence of a visual, aural, sensory, or software indicator, which may take the form of a "user" icon (531). Provided an individual principal has been explicitly granted a right to the resource container (as opposed to only inheriting the right from any of the antecedents of the resource container or the individual principal), the icon is displayed at the intersection of the individual principal column and the resource container. If there are no individual principals who have been granted explicit rights to the corresponding resource container, the cell will be blank (532).

Secondary View

Figure 7:
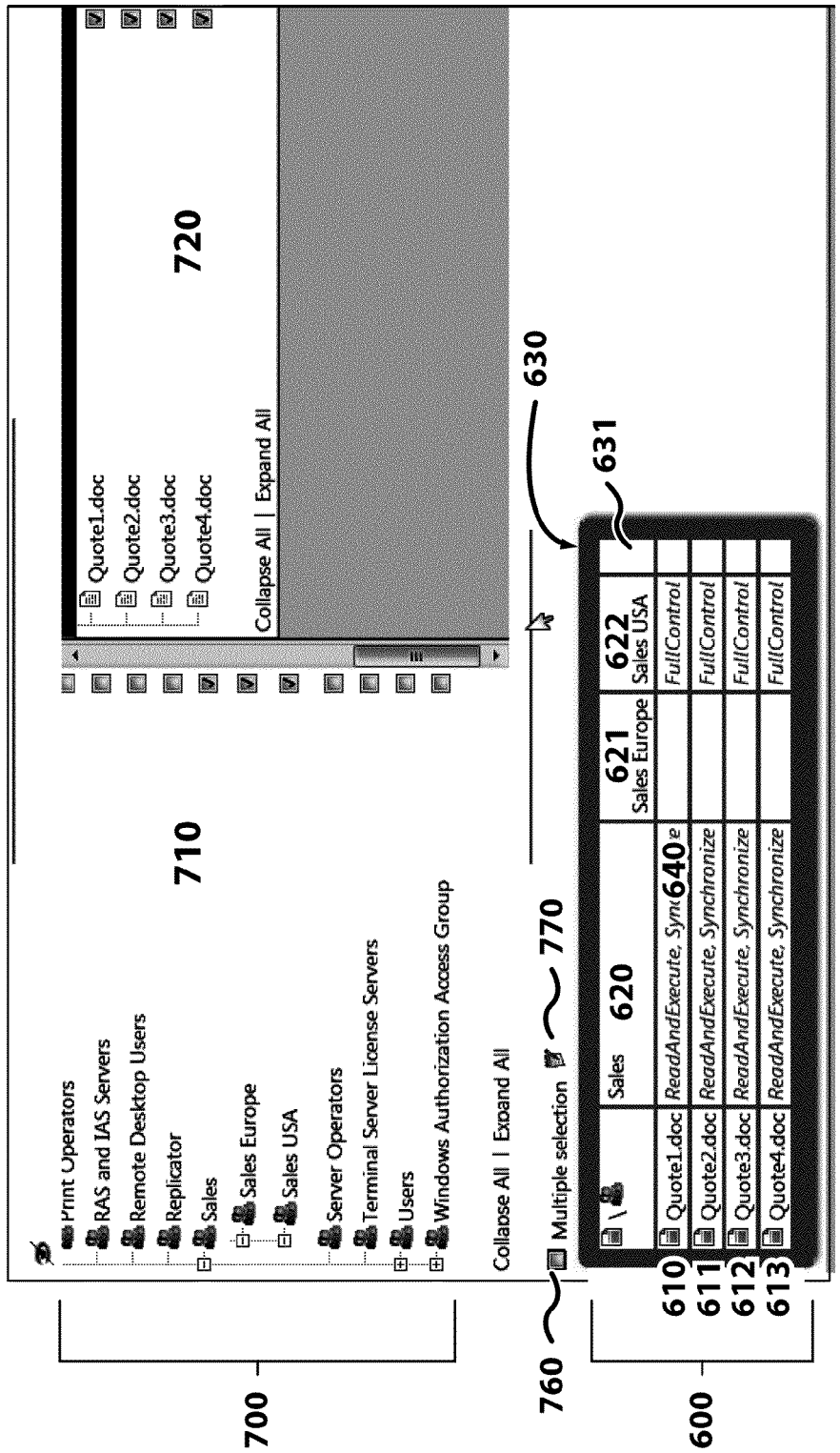
FIG. 7 illustrates the Secondary View with the Secondary Navigation Tool and Secondary Security Matrix open, the Secondary Security Matrix populated with selected principal groups and selected resources according to an exemplary embodiment.
Figure 8:
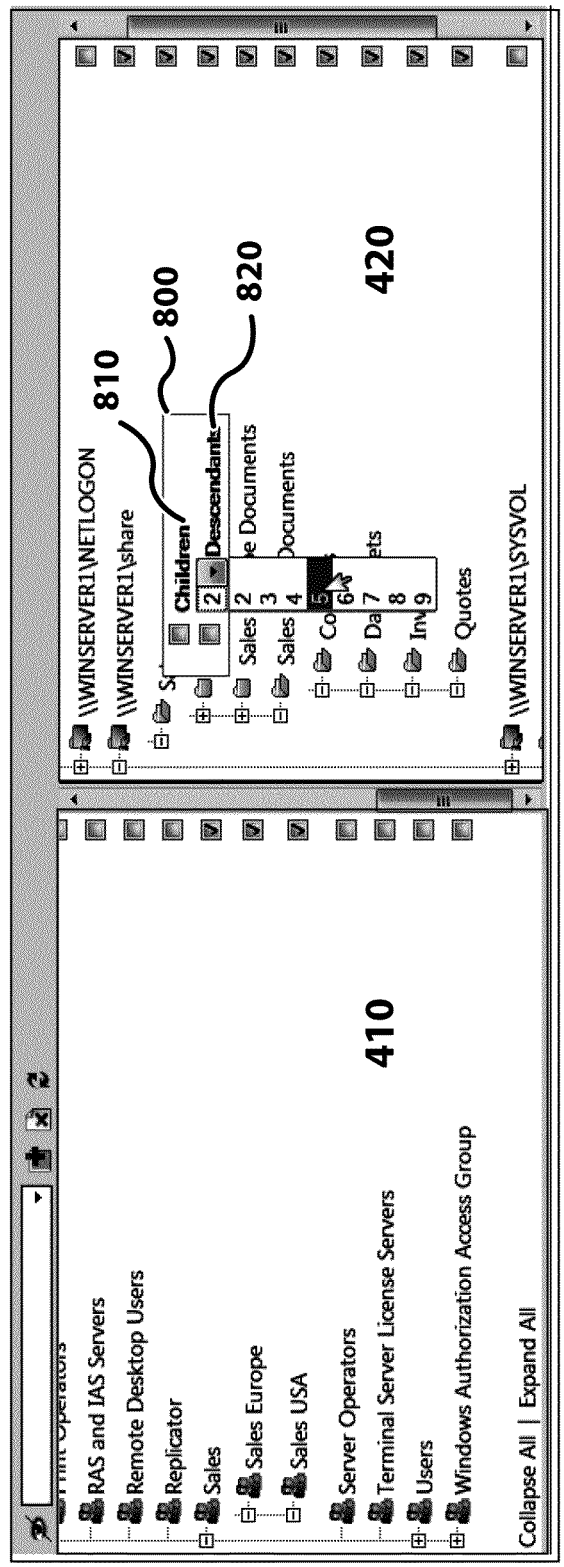
FIG. 8 illustrates a Navigation Tool with Descendent context menu open according to an exemplary embodiment.

FIG. 7 depicts the secondary view user interface of an exemplary embodiment. The secondary view allows administrators to manage security rights over individual resources, such as files, documents, printers, workstations, anything that is not a computer resource container for any type of principal (i.e., groups and individuals).

For each resource container (e.g., folder) in the system, it is possible to open a secondary view to manage security right over the container's contents (e.g., files). In order to open the secondary view the administrator may click on a resource container in the right panel of the main navigation tool (420). Once a resource container is selected, the secondary view is opened in a new window. The initial state of the secondary view may comprise a hidden secondary navigation tool and an empty secondary security matrix.

Secondary Navigation Tool

When the secondary navigation tool (700) is expanded, the secondary navigation tool of the secondary view appears and functions similarly to the main navigation tool (400), except that it will display the list of individual resources, such as files (720), within the resource container selected in the main navigation tool.

Secondary Security Matrix

Referring now to FIG. 7, there is a diagram depicting the secondary security matrix according to an exemplary embodiment. Each row of the secondary security matrix (600) represents an individual resource contained in the resource container that has been selected in the main navigation tool (e.g., 610 to 613). The secondary security matrix (600) is similar in appearance and functionality as the main security matrix, except that the resource containers axis is replaced by an individual resources axis. Hence, the secondary security matrix is sub-matrix that provides a magnified view of the main security matrix and allows the administrator to list and manage the security permissions for individual resources within a specific resource container. The user may create multiple secondary security matrices by selecting multiple resource containers in the main navigation tool.

Secondary Security Matrix Individual Principal Column

Additionally, the last column of the secondary security matrix depicted in FIG. 7 (630) identifies the existence of explicit rights granted to individual principals for an individual resource via the presence of a visual, aural, sensory, or software indicator, such as a "user" icon, in the cell corresponding to the resource. Provided an individual principal has been explicitly granted a right to the individual resource (as opposed to only inheriting the right from any of the antecedents of the resource or the individual principal), the icon is displayed at the intersection of the individual principal column and the resource. If there are no individual principals who have been granted explicit rights to the corresponding resource, the cell will be blank (631).

Displaying Permissions

Figure 10:
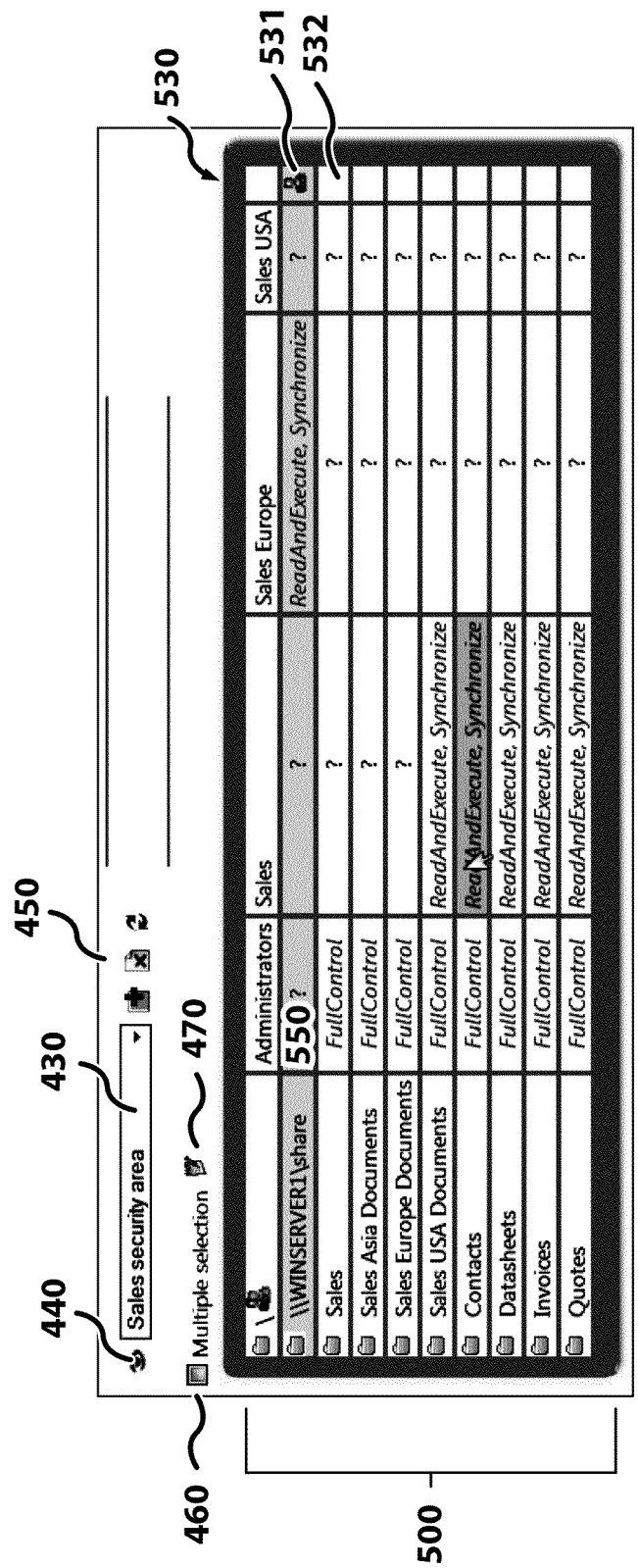
FIG. 10 illustrates the display of a Security Area according to an exemplary embodiment.

When a set of principals or resources is selected through the navigation tool, the corresponding security matrix will open and an identifier indicating that the cell's permission status has not been processed, such as a question mark, will be initially displayed in the cells (550) (see FIG. 10). Displayed permissions are not processed immediately or simultaneously in order to avoid performance issues and overloads from Active Directory read requests and the processing of permissions consolidation, i.e., the calculation of merging rights rules. Permissions may be calculated and displayed in the matrix one by one in a random order through asynchronous AJAX queries to the Active Directory, or other directory service database, until the contents for the entire security matrix has been calculated and displayed. Thus, while the security matrix opens immediately, information about the access rights of the elements within the matrix is not immediately available, but will be available after the queries have been completed. This "asynchronous processing" of permissions delays the display of all of the contents of the security matrix, but enables the user to immediately view the security matrix's structure, including the titles of the rows and columns (i.e., resources and principals). This new display method is essential to making very large matrices quickly readable because, for example, 100 resource containers and 100 principals would require 10,000 cells to be calculated and displayed at once, which one of ordinary skill in the art would appreciate as taking a noticeable amount of time to calculate and display. By displaying the matrix structure first, and having the contents of the cells filled in asynchronously, the administrator will be able to visually determine the status of the matrix's calculation progress without feeling frustration at a long "load" time as could happen with other security management user interfaces.

Another optimization of the present invention for when the security matrix display system has to process the security permissions of a large number of cells is the setting of a parameter "Nmax," which sets the maximum number of cells that the system will process and display for selected resources and principals. The Nmax number is configurable in a settings page of the present invention, and whenever the number of cells to be displayed by a security area exceeds the Nmax setting, the security matrix will process and display rights for up to Nmax cells and then will leave the question mark indicators for the remaining cells. The administrator may then have the system process and display the permissions of the unprocessed cells by hovering over the cells and the quotation marks will be replaced by the consolidated access rights for those cells.

Therefore, the present invention reduces the system response time for the administrator by selectively processing the security display of the selected resources and principals before allowing the administrator to interact with a security matrix. The administrator also has the option to further reduce the system response time for security matrices by manipulating the Nmax setting and thereby configure the amount of idle time the administrator will to wait upon before manipulating the system.

Interruption of Inheritance

Figure 11:
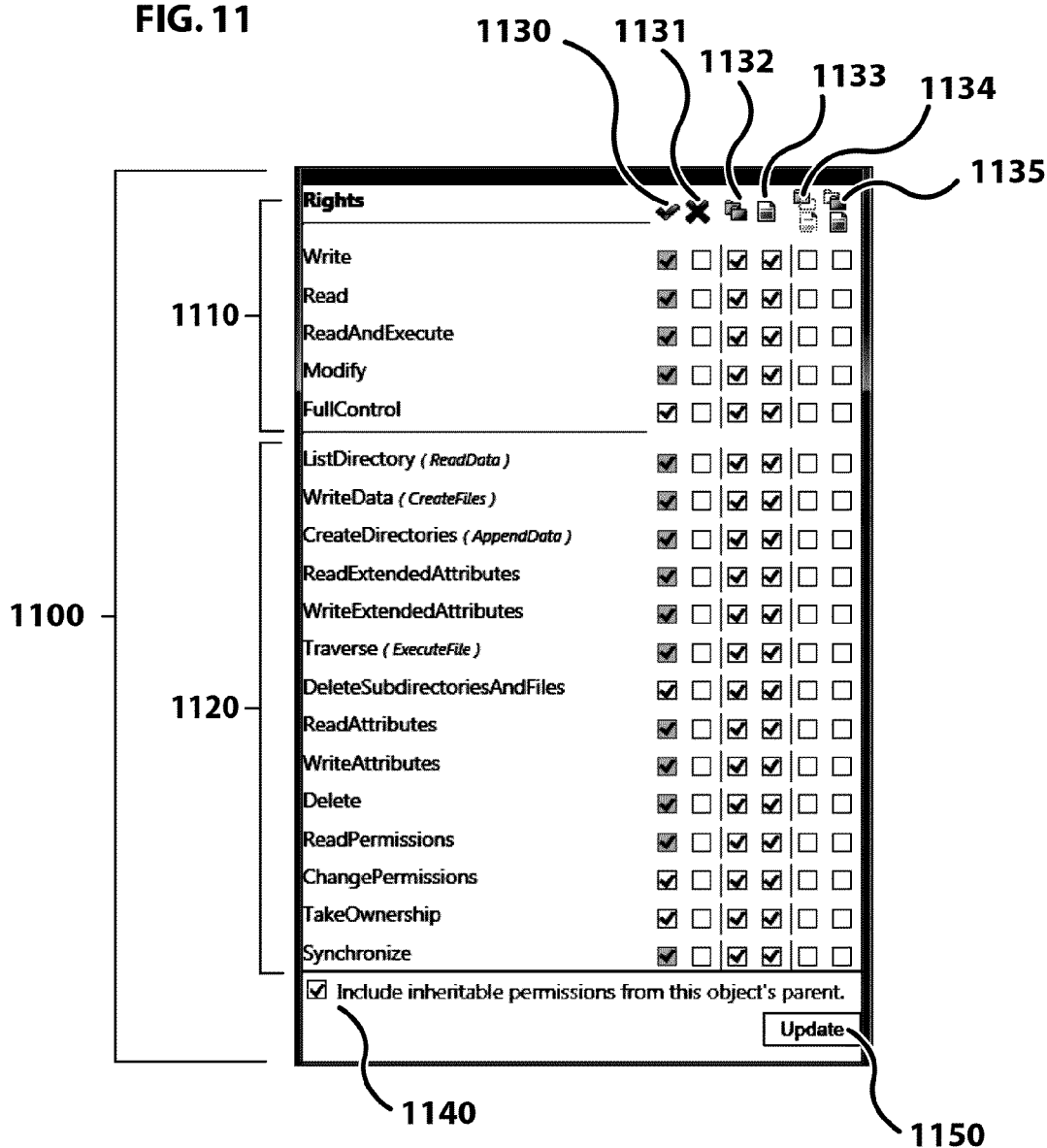
FIG. 11 illustrates the Permissions Settings Interface according to an exemplary embodiment.

Additionally, if a resource container or its contents does not inherit permissions from its antecedents (via the "Include inheritable permissions" setting (1140) in the Permissions Settings Interface (1100) in FIG. 11), the line in the security matrix that represents this element is darkened to warn the administrator that permission inheritance has been turned off for that resource container or resource (compare 510 to 511 or 512 in FIG. 5). The administrator may toggle the "inherit" permission settings in the Permissions Settings Interface (1100) for the resource container or resource (FIG. 11).

Implementing Permissions for Principal Groups

Referring now to the main and secondary security matrices (see e.g., FIGS. 5 and 7), when an administrator wishes to modify permissions for a principal group over a resource, the administrator may click on the related cell in the main or secondary security matrix. Once clicked, a Permissions Settings Interface (1100) will open that will allow the administrator to set permissions between the principal and the resource related to the cell (FIG. 11).

In prior art systems offering security features, implementing security permissions was very tedious. As an example, the Microsoft Windows operating systems that implement the NTFS file system, advanced management of Access Control Lists ("ACLs") on a folder required many steps. A user would have to go back to a single screen several times in order to apply rights depending on whether they wanted to apply a right to: 1) only the folder; 2) the folder, the subfolders and files; 3) the folder and subfolders; 4) the folder and files; 5) subfolders and files only; 6) subfolders only; or 7) files only. See FIGS. 1-3 and 13 for an example of a prior art Microsoft Windows user interface. Moreover, once permissions were set in the prior art system, there could be multiple entries involving the same user group and same folder (or file), but with the entries each specifying different (and potentially conflicting) rights. For example, as can be seen in the prior art Microsoft Windows permissions tab depicted in FIG. 2 there are multiple entries for the "Sales (MYDOMAIN\Sales)" entry. Needless to say, allowing multiple entries for one folder/file and user group relationship pair makes it difficult and confusing for an administrator to determine the exact permissions that a folder/file and user group has, and makes managing such security settings needlessly complex and prone to error. Furthermore, the number of lines that are displayed within such a needlessly complex interface can quickly grow to unmanageable proportions, with the maximum permissions equaling the following formula: Number of Lines of Permissions=("number of different types of permissions" X "number of different inheritances" X "number of distinct resources to apply the permissions to").

It is for this reason that the present invention offers an interface that simplifies the display of the permission settings available in the system using the Permissions Settings Interface (1100) as a single window. Through this interface, it is possible for the administrator to grant or deny (1130 to 1135) each right or group of rights (1110 and 1120) to resources and for the administrator to set the propagation scope (1140), whereas in the Microsoft Windows user interface discussed above the same information and settings were displayed across multiple windows.

Referring again to FIG. 11, access rights combinations (or so called basic permissions, group of rights, or access levels) (1110), such as Write, Read, ReadAndExecute, Modify, and FullControl, are displayed in the interface first and then the advanced rights (1120), such as ListDirectory, WriteData, CreateDirectories, ReadExtendedAttributes, WriteExtendedAttributes, Traverse, DeleteSubdirectoriesAndFiles, ReadAttributes, WriteAttributes, Delete, ReadPermissions, ChangePermissions, TakeOwnership, and Synchronize are displayed. The first checkbox column of the interface (1130) allows the administrator to grant that access right to the underlying resource (containers or individual)/principal (group or individual) relationship pair, while the second checkbox column (1131) is used to explicitly deny that right to the pair. The third column (1132) allows inheritance on sub-containers, and the fourth column (1133) allows inheritance on individual resources. Next, the fifth column (1134) permits the right to be applied only to the current resource container or resource, and the last column (1135) applies the rights only to individual resources and sub-containers. Furthermore, administrators have the ability to create their own access rights combinations, enabling the administrator to use rights combinations that are not natively available on the file system. Newly created access rights combinations may be assigned a color and a description, which enables the administrator to quickly and easily identify the newly created combination when used in the matrix. To create new access rights combination, the administrator can check the required advanced rights and through a "save" button store this customized combination as a new access rights combination, giving it a name, color, and description.

Below is an exemplary table (Table 1) containing a comparison of the scope of the propagation of user rights in a Microsoft Windows environment and the scope of the propagation of rights in the exemplary embodiment. For each available right in the NTFS security settings, the exemplary embodiment provides four categories of propagation (see columns of Table 1), that correspond to security permissions available in the Permissions Settings Interface (1100) ("Inheritance over Subfolders" (1132), "Inheritance over Files" (1133), "Apply only to Current Folder" (1134), "Apply only to Subfolders and Files" (1135)), whereas Microsoft's NTFS security settings require the administrator to select from seven choices for each security right (see rows of Table 1).

TABLE 1

|  | Inheritance over Subfolders | Inheritance over Files | Apply only to Current Folder | Apply only to Subfolders and Files |
| --- | --- | --- | --- | --- |
| Folder only | Unchecked | Unchecked | Checked | Unchecked |
| Folder, Subfolders and Files | Checked | Checked | Unchecked | Unchecked |
| Folder and Subfolders | Checked | Unchecked | Unchecked | Unchecked |
| Folders and Files | Unchecked | Checked | Unchecked | Unchecked |
| Subfolders and Files | Checked | Checked | Unchecked | Checked |
| Subfolders | Checked | Unchecked | Unchecked | Checked |
| Files | Unchecked | Checked | Unchecked | Checked |

When a combined right, also known as a basic permission, group of rights, or access level, is checked, all of the advanced rights that belong to this combined right are checked automatically. For instance, when an administrator checks "Full Control," all of the other permissions are checked automatically. If one unchecks a right belonging to a combined right, then the combined right is unchecked. Combined rights and scope level may change depending on which computer system the present invention is applied to.

Implementing Permissions for Individual Principals

Figure 12:
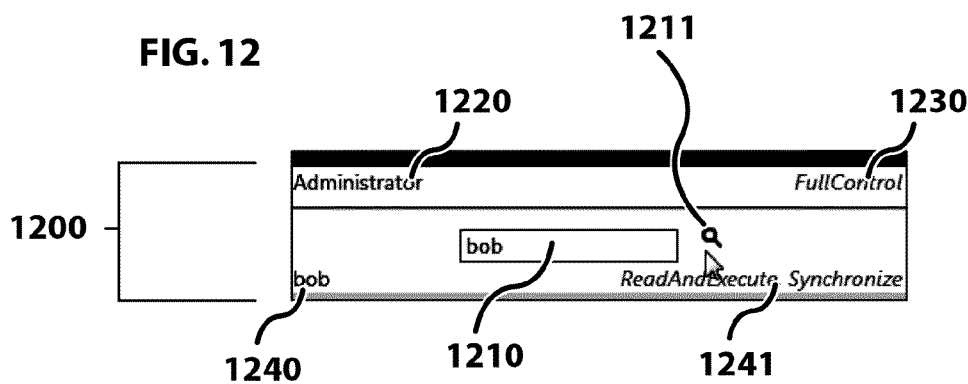
FIG. 12 illustrates the Principal Search Interface according to an exemplary embodiment.
Figure 13:
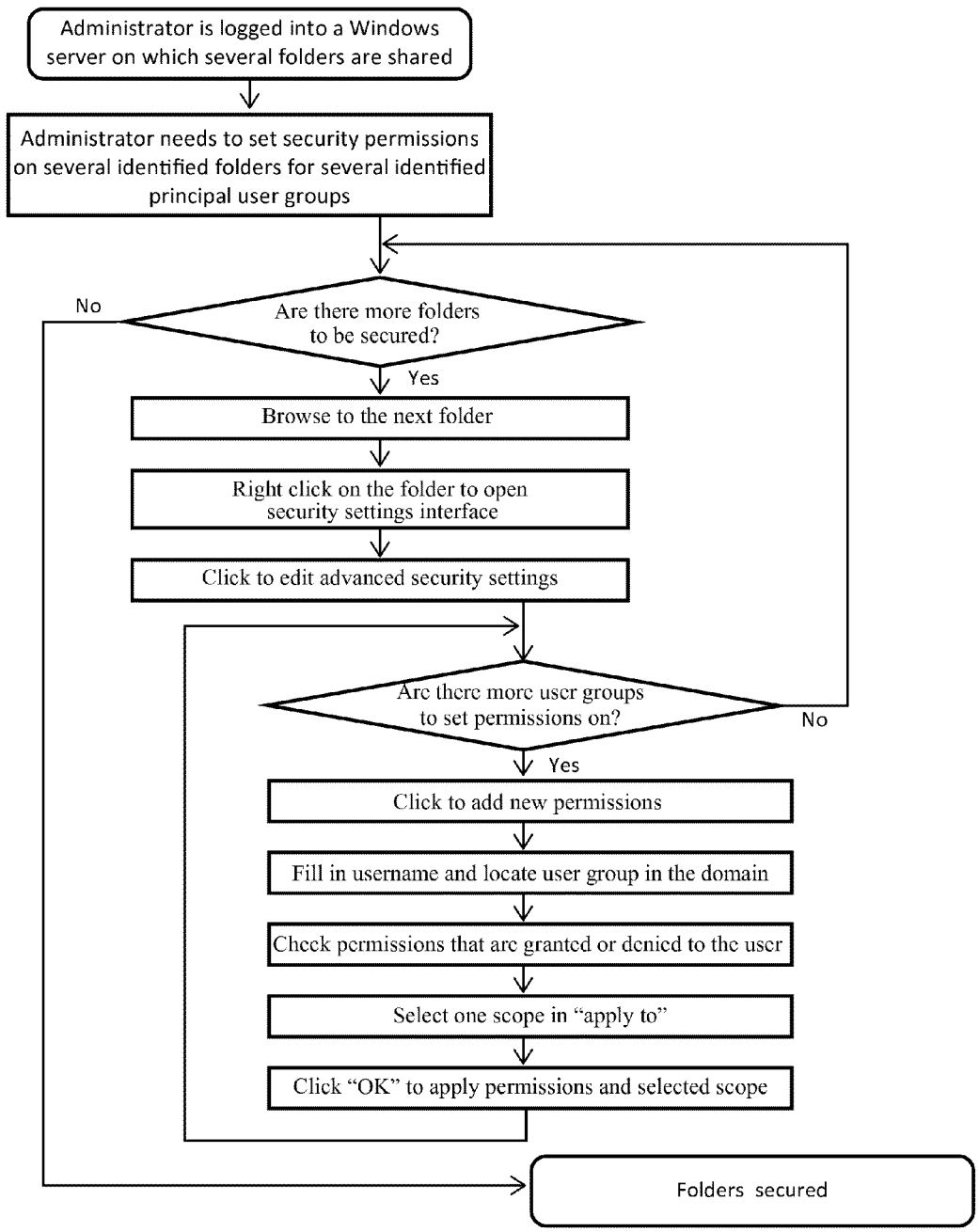
FIG. 13 is a flowchart depicting a prior art process for setting computer resource permissions and rights.

Clicking on the cell in the last column of the security matrix for a selected resource or resource container in either the main security matrix or the secondary security matrix will open a new window (FIG. 12) that lists all of the individual principals who were explicitly granted rights on the resource or resource container, if any. If additional individual principals need explicit rights to the selected resource or resource container, the administrator may search for other the additional individual principals by using the search box (1210) provided in the Principal Search Interface (1200). Once a search has been performed, the search results (1240) are listed below the search box (1210) along with the principal's current effective permission (or a blank cell if no permissions have been explicitly granted for that principal), for the selected resource or container (1241). If the administrator wishes to modify or grant an explicit permission to the individual principal for the resource or container, the administrator may click on the cell that displays the principal's current permission level (1241). This will open the Permissions Settings Interface (1100) and will allow the administrator to define permissions for the individual principal over the previously selected resource or resource container. Additionally, the current administrator's user name (1220) and security management system access level (1230) is displayed at the top of the window, in order to help the administrator determine which principals the administrator may have access to and what rights the administrator may grant to that user, in case the administrator is not a full administrator of the system and is unsure as to why his or her access is restricted or finds that options are unavailable.

Influence of Rights Modification

When a right has been modified as described above, the affected cells are refreshed and replaced with the updated permissions. All displayed cells of related descendant resources and descendant principals have their displayed rights updated automatically and immediately. Therefore, the impact of the modification of a right on all its descendants (principals and resources) is immediately displayed on the administrator's screen.

Mass Selection Tool

Referring again to FIGS. 4 and 7, in order to simplify the administration of rights in multiple cells at the same time the present invention provides a mass selection tool (460 and 760) that allows an administrator to apply the same set of rights to multiple cells when using the main and secondary views. When the mass selection tool (460 and 760) is activated, the administrator will be able to select several cells, which are then underlined, instead of opening the Permissions Settings Interface for each of the cells. The administrator may then select the "Update selected rights" icon (470 and 770) to open the Permissions Setting Interface (1100), and set a permission setting that will be applied to the mass selected cells.

Security Areas

Figure 9:
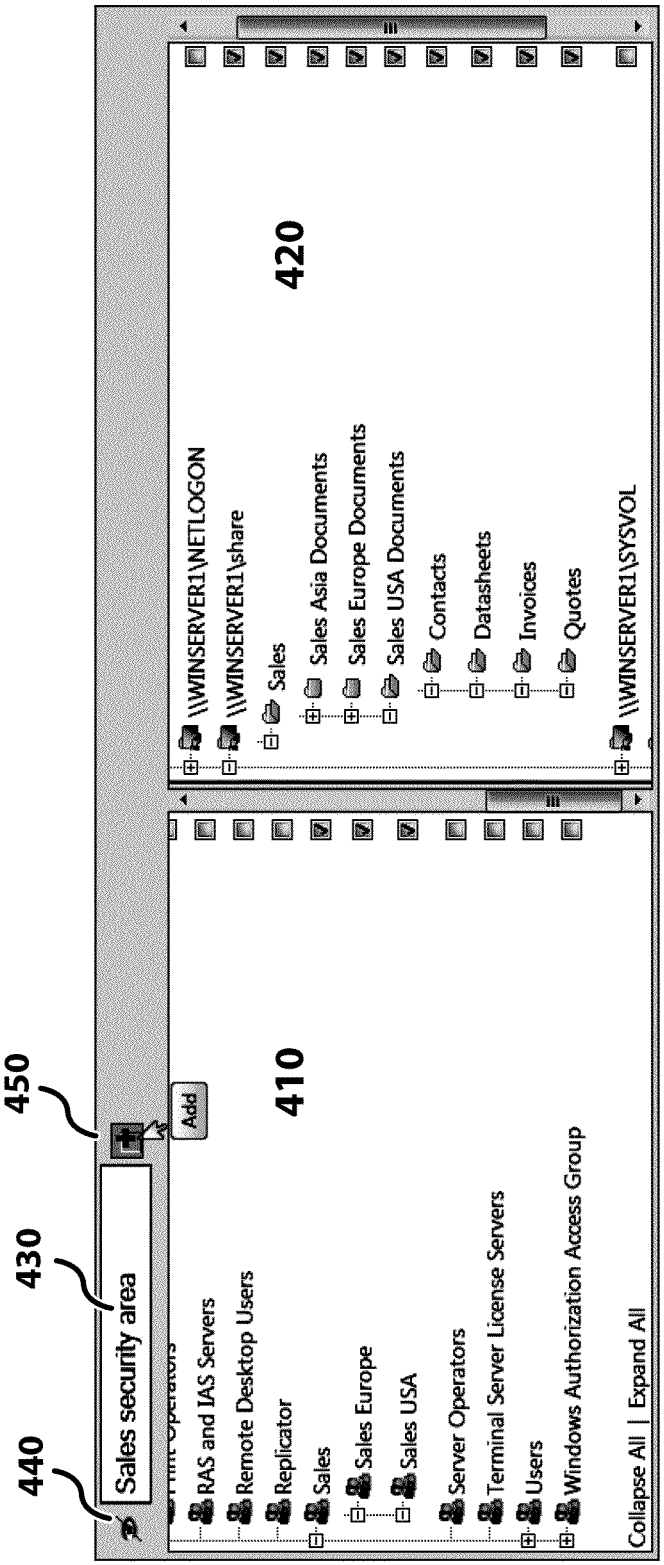
FIG. 9 illustrates the creation of a new Security Area according to an exemplary embodiment.

Referring now to FIGS. 9 and 10, a further optimization of the present invention is the ability given to the administrator to save the selections he or she has made in the navigation tool for later viewing and browsing. This "security area" concept allows an administrator to quickly browse frequently used selections and to do so without having to manually select all of the resources using the navigation tool once the initial selection has been made and the security area is named and saved using the security area save option (450). Afterwards, the administrator will be able to access this security area through a drop-down list that contains the names of all saved security areas that the administrator has access to (430). When viewing a security area, the navigation tool may be hidden or displayed. Once a security area is selected, the principals and resources previously selected within that security area are automatically selected in the corresponding navigation tool, and the corresponding security matrix will be populated automatically with the selected elements' security rights.

Other Possible Implementations

While the present invention has been described in detail and with reference to specific embodiments for the convenience of the reader, it will be apparent to one of ordinary skill in the art that various changes, rearrangements, and modifications may be made to the construction or performance of the disclosed invention without departing from the spirit and scope of the present invention. Therefore it is intended that the present invention cover variations and modifications of the present invention provided that they fall within the scope of the appended claims and their equivalents.

What is claimed is:

1. A matrix security management system for managing security rights over a computer system or network, the system comprising:
   at least one computer;
   at least one computer resource or resource container;
   at least one principal or principal group that requires access to said at least one computer resource or resource container;
   a graphical user interface for displaying, and managing, said at least one principal or principal group and said at least one computer resource or resource container, and their respective access rights and settings;
   said graphical user interface further comprising:
   a module configured to read and modify the access rights or settings of said at least one computer resource or resource container installed on said computer system or network for said at least one principal or principal group;
   a collapsible navigation tool;
   an authentication module; and
   at least two security matrices for the display and management of resources and principals;
   said at least two security matrices further comprising:
   a main security matrix comprising at least two axes;
   a first axis of the main security matrix representing one or more resource containers on said computer system or network;
   a second axis of the main security matrix representing one or more principals or principal groups of said computer system or network;
   at least one secondary security matrix comprising at least two axes;
   a first axis of the at least one secondary security matrix representing one or more resources within a resource container on said computer system or network;
   a second axis of the at least one secondary security matrix representing one or more principals or principal groups of said computer system or network;
   said main security matrix and said at least one secondary security matrix each further comprising a visual, aural, sensory, or software indicator that signifies the presence of one or more individual principals who have been granted explicit access rights or settings to one or more of the resource or resource containers displayed in said main security matrix or said at least one secondary security matrix.

2. The system of claim 1, wherein said graphical user interface further comprises:
   a navigation tool comprising at least one panel area for the display of information about said computer system or network;
   said navigation tool further comprises:
   a first panel area that displays a nested tree representation of the resource containers of said computer system or network;
   a second panel area that displays a nested tree representation of the principal groups of said computer system or network; and
   wherein selecting an element contained within said first or second panel areas causes said element and all of said element's antecedents to populate one of the said at least two security matrices.

3. The system of claim 2, wherein said graphical user interface further comprises:
   wherein deselecting said selected element In said navigation tool will deselect said selected element and selected element's descendant elements in said navigation tool and remove said selected element and descendant elements of said selected element automatically from said at least two security matrices; and
   wherein selecting an element's title in said at least two security matrices will remove said element and said element's descendants in said navigation tool remove said element and said element's descendants from said at least two security matrices.

4. The system of claim 1 wherein said navigation tool further comprises:
   a context menu that allows the selection of all descendants of a displayed element automatically for viewing in said at least two security matrices and allows the selection of the number of levels of descendants to in said at least two security matrices.

5. The system of claim 4, wherein said navigation tool is capable of saving to memory as a security area said selected elements.

6. The system of claim 1, wherein the authentication module is configured to authenticate an administrator accessing said matrix security management system;

said authentication module is further configured to determine the access level of administrator;

said authentication module is further configured to populate said administrator's graphical user interface with the appropriate display commensurate with said administrator's access level; and said authentication module is further configured to restrict said administrator's graphical user interface from displaying information that is not within said administrator's access level.

7. The system of claim 1, wherein said navigation tool further comprises a list of one or more security areas that said administrator selects for display on said navigation tool and said at least two security matrices.

8. The system of claim 1 wherein said at least two security matrices further comprises a display of said principal's access rights to said resource, wherein said access right display differs depending upon how said access right was granted.

9. The system of claim 8, wherein said access right is displayed in a first manner when said access right was explicitly granted for said element;

wherein said access right is displayed in a second manner when said access right was granted because of the inheritance of a right from an antecedent of said element;

wherein said access right is displayed in a third manner when said access right was granted because of the merging of an explicitly granted right for said element and an inherited right from said element's antecedents;

wherein said access right is displayed in a fourth manner when said access right is a customized combined access right.

10. The system of claim 9, wherein said at least two security matrices differentiate a resource container or a resource that does not inherit permissions from said resource container's or said resources parent container.

11. The system of claim 1, further comprising a mass selection tool embedded within said at least two security matrices, said mass selection tool configured to allow said administrator to select multiple elements and change the rights for those elements at one time.

12. The system of claim 1, wherein said at least two security matrices further comprise a permissions settings interface that allows an administrator to create and save customized combined access rights for use in said at least two security matrices.

13. The system of claim 1, further comprising:

an individual principal list that displays all of said individual principals granted explicit rights on said resource container or said resource; and said individual principal list further comprising a search engine capable of searching for additional individual principals in order to grant new explicit rights to said additional individual principals.

14. A method for administering security rights over a computer system or network, comprising:

authenticating an administrator of a computer system or network;

determining said administrator's access level for said computer system or network;

granting access to said administrator to a graphical user interface that displays tools and information commensurate to said administrator's determined access level;

restricting said administrator's graphical user interface from displaying information that is not within said administrator's access level;

displaying on said graphical user interface at least two security matrices that allows for the management of resources or resource containers and principals or principal groups of said computer system or network;

wherein displaying at least two security matrices further comprises:

generating a main security matrix comprising at least two axes;

generating a first axis of said main security matrix representing one or more resource containers on said computer system or network;

generating a second axis of said main security matrix representing one or more principals or principal groups of said computer system or network;

generating at least one secondary security matrix, each secondary security matrix comprising at least two axes;

generating said first axis of said at least one secondary security matrix representing one or more resources within a resource container on said computer system or network;

generating said second axis of said at least one secondary security matrix representing one or more principals or principal groups on said computer system or network; and identifying the presence of one or more individual principals who have been individually granted explicit access rights to one or more of the resource or resource containers displayed in said main security matrix or said at least one secondary security matrix using a visual, aural, sensory, or software indicator.

15. The method of claim 14, further comprising:

generating a navigation tool comprising at least one panel area for the display of information about said computer system or network;

generating a first panel area that displays a nested tree representation of the resource containers of said computer system or network in said navigation tool;

generating a second panel area that displays a nested tree representation of the principal groups of said computer system or network in said navigation tool;

wherein selecting an element contained within said first or second panel area causes said element and all of said element's antecedents to populate one of the said at least two security matrices; and displaying said navigation tool.

16. The method of claim 15, further comprising:

removing an element and said element's descendants from said at least two security matrices when said element has been deselected in said navigation tool; and removing an element and said element's descendants from said at least two security matrices when said element's title has been selected in said at least two security matrices.

17. The method of claim 14, further comprising:

saving said selected elements to memory as a security area that is capable of being viewed later by an administrator of the system.

18. The method of claim 14, further comprising:

generating a context menu that allows the selection of all descendants of a displayed element automatically for viewing in said at least two security matrices, and allows the selection of the number of levels of descendants to view in said at least two security matrices.

19. The method of claim 14, further comprising:

presenting from within said navigation tool a list of one or more security areas that said administrator selects for display on said navigation tool and said at least two security matrices.

20. The method of claim 14, further comprising:

displaying said at least one principal's access rights to said at least one resource, wherein said access right display differs depending upon how said access right was granted.

21. The method of claim 20, further comprising:

displaying said access right in a first manner when said access right was explicitly granted for said element;

displaying said access right in a second manner when said access right was granted because of the inheritance of a right from an antecedent of said element;

displaying said access right in a third manner when said access fight was granted because of the merging of an explicitly granted right for said element and an inherited right from said element's antecedents;

displaying said access right in a fourth manner when said access right is a customized combined access right.

22. The method of claim 21, further comprising:

generating an identifier within said at least two security matrices that differentiates a resource container or a resource that does not inherit permissions from said resource container's or said resource's parent container.

23. The method of claim 14, further comprising:

displaying a mass selection tool embedded within said at least two security matrices, said mass selection tool configured to allow said administrator to select multiple elements and change the rights for those elements at one time.

24. The method of claim 14, further comprising: generating a permissions settings interface that allows an administrator to create and save customized combined access rights for use in said at least two security matrices.

25. The method of claim 14, further comprising:

generating an individual principal list capable of displaying all of said individual principals granted explicit rights on said resource container or said resource; and displaying a search engine capable of searching for and displaying additional individual principals in said individual principal list in order to grant new explicit rights to said additional individual principals.

* * * * *